(12) United States Patent
Hughes et al.

(10) Patent No.: US 7,073,133 B2
(45) Date of Patent: Jul. 4, 2006

(54) OBJECTS AND METHODS FOR ACCESSING A DATA SOURCE AND ENHANCING AN APPLICATION

(76) Inventors: William Hughes, 13 Twin Park Dr., Randolph, NJ (US) 07869; Betty J. Hughes, 25 Avondale Ave., Haddonfield, NJ (US) 08033

( * ) Notice: Subject to any disclaimer, the term of this patent is extended or adjusted under 35 U.S.C. 154(b) by 834 days.

(21) Appl. No.: 09/858,070

(22) Filed: May 16, 2001

(65) Prior Publication Data
US 2003/0030672 A1    Feb. 13, 2003

(51) Int. Cl.
    G06F 3/00    (2006.01)
(52) U.S. Cl. ............... 715/765; 715/762; 715/744; 715/968
(58) Field of Classification Search ............. 715/744, 715/760, 764, 780, 700, 810, 835, 840, 968, 715/501.1, 513, 517–520, 765, 762; 707/1, 707/4
    See application file for complete search history.

(56) References Cited

U.S. PATENT DOCUMENTS

| | | | | |
|---|---|---|---|---|
| 5,426,781 A | * | 6/1995 | Kaplan et al. ............... | 707/4 |
| 5,937,155 A | * | 8/1999 | Kennedy et al. ............. | 714/38 |
| 5,983,268 A | * | 11/1999 | Freivald et al. ............. | 709/218 |
| 6,078,924 A | * | 6/2000 | Ainsbury et al. .......... | 707/101 |
| 6,523,022 B1 | * | 2/2003 | Hobbs ........................... | 707/3 |
| 6,529,217 B1 | * | 3/2003 | Maguire et al. ............. | 715/769 |
| 6,701,485 B1 | * | 3/2004 | Igra et al. ................... | 715/503 |
| 6,738,079 B1 | * | 5/2004 | Kellerman et al. ......... | 715/763 |
| 6,760,720 B1 | * | 7/2004 | De Bellis ..................... | 707/3 |
| 6,760,748 B1 | * | 7/2004 | Hakim ....................... | 709/204 |
| 6,779,151 B1 | * | 8/2004 | Cahill et al. ................ | 715/503 |
| 2004/0165007 A1 | * | 8/2004 | Shafron ....................... | 345/781 |

OTHER PUBLICATIONS

Moseley et al. (Mastering Microsoft Office 97, Professional Edition, Second Edition, Published by Sybex, pp. 873-888; 1997).*

* cited by examiner

Primary Examiner—Sy D. Luu
(74) Attorney, Agent, or Firm—Thomas L. Adams

(57) ABSTRACT

A software object and method is arranged to enhance an application. The enhanced application permits a user to enter (or retrieve) for processing and display at least one ordinary expression, such as a stock symbol. The software object is capable of accessing a data source and employs a query generator, a composer, and an interface. The query generator can implement the processes of (a) electronically reading the ordinary expression, and (b) requesting information from the data source based on the ordinary expression. The composer can implement the processes of (a) receiving requested information from the data source in response to the query generator, and (b) automatically transferring the requested information to the application for processing and display alongside the ordinary expression. The interface can allow the user to adjust in advance where the application will display the requested information.

76 Claims, 7 Drawing Sheets

OBJECTS AND METHODS FOR ACCESSING A DATA SOURCE AND ENHANCING AN APPLICATION

BACKGROUND OF THE INVENTION

1. Field of the Invention

The present invention relates to information processing systems and methods for transferring to, and updating information on, information handling systems such as spreadsheets, word processors, and the like, with information from web pages, other unstructured flat files, structured data sources such a databases, and other sources.

2. Description of Related Art

Computer users have a need to take data from web pages, databases, or other data sources, and incorporate specific data items in an information handling system such as a spreadsheet, word processing document, etc. The displayed information can be organized in rows and columns or other dimensional formats. A columnar presentation is the natural presentation for a spreadsheet program. The foregoing presentation may include a word processing document that contains a table, a presentation graphics file with a table, a word processing bookmark, or a database organized into fields and records.

Referring to the prior art method of FIG. 1, a user can employ an ordinary browser 1 to operate over the Internet 2 and designate an Internet data source 3 by specifying a URL (Uniform Resource Locator), address, or file name. By formulating an appropriate web query 4, the user can retrieve the data into an Internet browser (operation 5) or other similar software program.

Next, using the Windows® clipboard, or a similar program, a user can extract (copy) the required information from the browser as shown in operation 6. The user would then paste the data into a separate document that can be used by, for example, spreadsheet application 7. If the structure of the data on the web page, or other similar document does not match the organization of the end document, multiple copy and paste operations would be required.

More sophisticated users might import the entire web page into a spreadsheet and then provide "links" to the required areas of the document. The term "links" refers to a memory-addressing scheme that allows an item in one document to be tied to another item so that when one item changes, the item linked to it also changes. While minimizing the copy and paste method, this approach still requires the user to enter a web address, copy and paste the data into a spreadsheet, and manually insert "links" for each data item required. This is still a very labor intensive operation. Many documents may require multiple web pages imported for a single update.

In commercially available spreadsheet programs (e.g., the Excel™ spreadsheet program) one can create web queries that allow one to fetch data over the World Wide Web and automatically load this data into a spreadsheet. To use this feature one must be skilled in writing statements in HTML (hyper text markup language). This requires a specialized skill that many users will not have the time or desire to acquire.

Commercially available programs can be modified with "add-ins." For example, objects are available for the Excel™ spreadsheet to assist a software designer who wishes to create such an add-in. Existing development tools can create add-ins for other applications. At a more fundamental level, a component object model (COM) has been developed, which defines a standard for software objects that can be used as components in software from third parties unrelated to the object developer. This COM standard has been applied across many platforms and forms the basis for more sophisticated techniques for establishing communications or a server-client relationship between different software programs. These various techniques offer tools that are understood by sophisticated software programmers and do not form a basis for allowing ordinary users of applications to extend the capability of those applications.

In U.S. Pat. No. 5,437,006 an Excel™ spreadsheet program allows user-defined macros to call DLLs, which are then able to call back to the spreadsheet program to change its state or use its various functions or commands. This reference shows general-purpose tools and is not arranged to enable a non-specialist to fetch and display data in a running application in a simple fashion.

In U.S. Pat. No. 6,078,924 applications such as Word™, Excel™, or PowerPoint™ can be extended with menus and buttons enabling a user to gain access to a database maintained by a catalog server and information server. The user can request that the catalog server obtain information from the World Wide Web and store the collected information in the database. This system can parse the information obtained over the Internet. The catalog server acts as an intermediary and retrieves data over the Internet according to its own search schedule. Operation of this system requires the deployment of a large scale, specialized database and is not designed to easily allow a single user to directly handle information currently available from the Internet and other sources without an intermediary.

In U.S. Pat. No. 5,983,268 a user can access a specialized web server over the Internet using a conventional browser. The user can identify certain web pages, which are then presented to the user who can then mark the data of interest. The web server will record marker information around the selected data so just the selected data can be parsed and retrieved later. The selected data can be later presented to the user in a spreadsheet format so the user can perform calculations based on various cells in the usual manner. Again, this system requires the deployment of a sophisticated server and is not designed to allow the user to directly handle information currently available from the Internet and other sources without an intermediary.

In U.S. Pat. No. 5,319,777 a number of personal computers are connected through a LAN to one or more table servers. Each of the PCS can run a conventional spreadsheet program. This system is designed to fetch existing tables and does not consider rearranging information to accommodate a user's preferences for display in a spreadsheet program or other application.

In U.S. Pat. No. 5,893,079 users at various workstations can send queries to a database over a network that can use TCP/IP. The user has a spreadsheet interface and can export the fetched data to a conventional spreadsheet program, such as the Excel™ program. This is a cumbersome approach requiring the user to switch from the downloading application to a spreadsheet application. Once the spreadsheet program is launched, the user is then faced with rearranging the downloaded data to meet personal preferences.

See also U.S. Pat. Nos. 5,819,271 and 5,864,871 (users access word processing documents or spreadsheet files over the Internet using a conventional browser; U.S. Pat. No. 5,381,470 (database created by accessing a computerized auto-dialer, and creating reports using conventional spreadsheet packages); U.S. Pat. No. 5,361,393 (accounting data is entered into a conventional spreadsheet program before being uploaded into a central database); U.S. Pat. No.

5,937,155 (planning software with spreadsheet-like interface); U.S. Pat. No. 5,293,615 (integration of a database and spreadsheet program). U.S. Pat. No. 5,784,545 (a spreadsheet program); U.S. Pat. No. 6,061,695 (a Windows® desktop is produced from a hypertext page); U.S. Pat. Nos. 5,778,357 and 5,414,838 (a query language for a database); and U.S. Pat. No. 5,297,032 (trading data is delivered to workstations on the trading floor).

SUMMARY OF THE INVENTION

In accordance with the illustrative embodiments demonstrating features and advantages of the present invention, there is provided an object for enhancing an application. The enhanced application permits a user to enter or retrieve at least one ordinary expression for processing and display. The object is capable of accessing a data source and has a query generator, a composer, and an interface. The query generator can (a) read the ordinary expression, and (b) request information from the data source based on the ordinary expression. The composer can receive requested information from the data source in response to the query generator and transfer the requested information to the application for processing and display alongside the ordinary expression. The interface can allow the user to adjust where the application will display the requested information.

In accordance with another aspect of the invention, there is provided a method for enhancing an application. The enhanced application permits a user to enter or retrieve at least one ordinary expression for processing and display. The method is performed with a data source and includes the step of electronically reading the ordinary expression. Another step is requesting information from the data source based on the ordinary expression. The method also includes the step of receiving requested information from the data source. Another step is automatically transferring the requested information to the application for processing and display alongside the ordinary expression. The method also includes the step of allowing the user to specify in advance of a request, where the application will display the requested information.

By employing objects and methods of the foregoing type an enhanced system can be achieved for updating tabular forms, or documents (FIG. 2, item 8), including the ability to automate and simplify the method of collecting, organizing, and posting information. The information may originate from a variety of sources including the Internet, databases, text files or other data sources. The preferred system presents a graphical user interface 8A (FIG. 2) for the user to control the data retrieval process, and select document format options. This includes options for the user to select data from the document or file, query the underlying data source 9, select data items returned from the data source, and determine the relative placement of these data items in the underlying document or file.

In a preferred embodiment of the present invention a software program (referred to herein as an object) will run concurrently with the underlying information handling program (referred to herein as an "application"), such as a spreadsheet, word processor, database software, etc. The preferred software object typically runs as a background program, and is conventionally referred to as an "add-in," which may be called as needed by the user. Once invoked, this software object will present a graphical user interface that allows the user to control the retrieval and posting of data to the underlying document or file.

The document or file to be updated may be organized into a dimensional structure such as a spreadsheet containing rows and columns. The preferred graphical user interface provides a means to identify data from within the document or file for querying the data source. For instance, a specific range from a spreadsheet may be specified which contains items that can be indexed to the underlying data source. The interface also provides the ability to select items from the data source that are associated with this index. This includes the means to select any number of these items, (in any sequence and order). Additionally, the interface provides the ability to specify the relative placement of the returned items in the document.

Preferably, the software object provides a means to automatically connect to the underlying data source and the ability to query the source based on the data specified in the underlying document or file associated with the running application. For instance, in the case of the Internet as a data source, the software has the ability to download a web page and parse and search the retrieved page for requested information. In the case of a database, the software has the ability to connect to the database and return data based on specific queries. It is highly desirable however, for the data source to be indexed on a specific item, and information associated with the items are returned based on this index. Once data is collected from the data source, it is posted in the document or file as specified by settings made in the user interface.

Other preferred features include the storage and recall of system settings associated with a particular document or file; the ability to undo changes made thereto; the choice of the originating data source; and other formatting options. The system is non-invasive and does not require the user to alter the underlying document or file in any way, and offers other significant automation advances when compared to the prior art.

The invention may be embodied in a software object that consists of all or part of the following elements:

1. An interface component for identifying the first data record to be updated and whether data for that record are to be organized in rows or columns. All additional data records are referenced relative to the first record. This first row or column already contains information to create the request for information to the data source. The data source will then return the additional data record items required by the document or file. For example, this process may consist of a dialog that allows the user to "point to" or reference the first symbol in a table. In a spreadsheet, this would be a cell reference, such as "D3". Another dialog box or software element may be used to specify row or column orientation.

2. A series of dialogs or other interface components for the user to select the data items to be retrieved and their sequence. For instance, in the case of data associated with a stock symbol, the user could choose to retrieve the last price and volume out of a list of ten data items. Multiple lists are provided to allow the user to select any item in any order.

3. A dialog or other interface component that allows an offset to be specified for all data items relative to the first data item. This allows the items to be arranged in a non-sequential order as needed by the user. This offset option can be set positive or negative, relative to the first data item.

4. Software used to capture the data from the data source. In the case of a web page, this may be the components of a web browser, a socket or other software to retrieve the required data directly into the underlying document or file. It also may be a program that retrieves data from a database or other structured or non-structured data source.

5. Software that can parse a retrieved web page and update the document or file based on the data requested through the user dialogs.

6. A series of dialogs or other interface components that allows the user to store and recall settings for multiple documents rather than always requiring manual recreation of these settings.

The present invention may also offer the following desirable features in order to enhance performance, power, and flexibility:

1. Select whether the program will add formatting or rely upon the user formatting in the underlying document or file.

2. Specify the source of the data. Specifically, a single interface may be used to interface with multiple data sources.

3. Refresh the data by re-executing the query.

4. Execute elements that link (or undo) the underlying document or file back to the data source to retrieve data that may exist in other formats or related data. In the case of a stock symbol, the user could "point" to a symbol and then by selecting this function, retrieve a web page that displays company news for this symbol.

5. Use a "command bar," "toolbar," or other software element that groups these additional functions in a convenient format for the user.

6. Automatically generate the data request and subsequent document updating at specified intervals. For example, one could update the specified document or file at intervals of 5 seconds without the user having to take any further action.

BRIEF DESCRIPTION OF THE DRAWINGS

The above brief description as well as other objects, features and advantages of the present invention will be more fully appreciated by reference to the following detailed description of presently preferred but nonetheless illustrative embodiments in accordance with the present invention when taken in conjunction with the accompanying drawings, wherein.

DETAILED DESCRIPTION OF THE PREFERRED EMBODIMENTS

Figure 3:
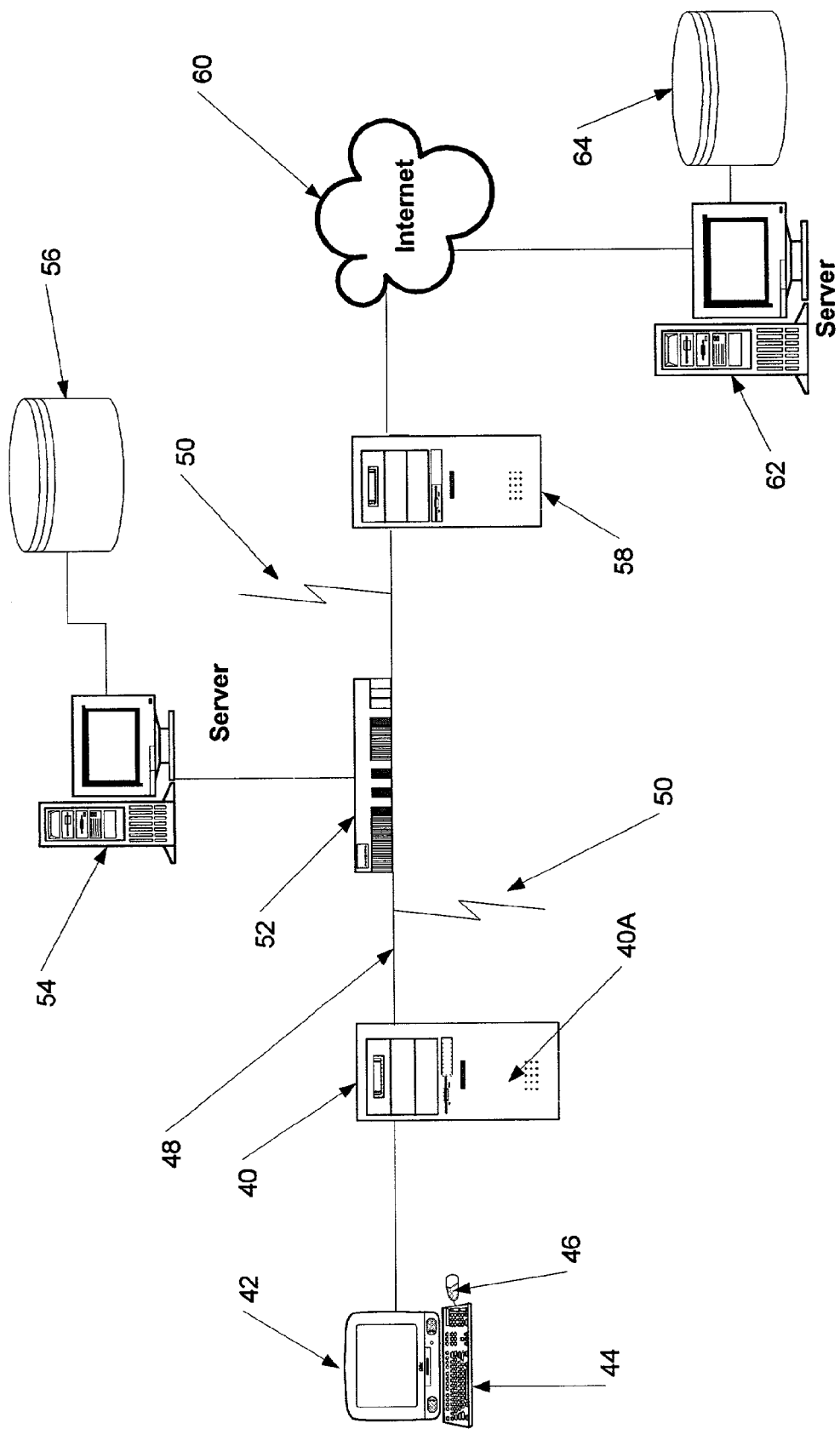
FIG. 3 is a block diagram of equipment capable of implementing the enhanced application of FIG. 2.

Referring to FIG. 3, a user's computer 40 is shown with conventional input/output devices; namely, monitor 42, keyboard 44, and pointing device (mouse) 46. The computer 40 has its own non-volatile memory 40A; for example, a hard drive. Memory 40A can contain one or more of a variety of applications, such as, spreadsheet programs, word processing programs, database programs, etc. Memory 40A can also contain a variety of files that may represent word processing documents, spreadsheets, or database files. The various items in memory 40A can be opened by a central processing unit in computer 40 in the conventional manner.

Computer 40 is shown connected in a network along network cable 48, which connects to other networked computers as indicated by phantom lines 50. Network cable 48 can also connect through router 52 to other networks. A server 54 is shown connected to network line 48 to supply various services to computers on the network. Server 54 can act as a file server and also as a database server for permitting access to database 56.

The network is also shown connecting to another server 58, which acts as a router and provides a gateway and firewall between network cable 48 and the Internet 60. Accordingly, computer 40 can access the Internet 60 through server 58 to obtain information in the usual way. A web server 62 is shown being accessible over Internet 60. Web server 62 makes available a database 64. In this embodiment database 64 contains financial information correlated to stock symbols, although other classes of data may be offered by different web servers established for different purposes.

In other embodiments, computer 40 may be a personal computer (PC) that is not part of a network. This PC may in some instances gain access to a global communications network, such as the Internet, through an individual DSL line, cable access, high-speed T1 line, or dial up connection.

In the present, exemplary embodiment, computer 40 may run a spreadsheet program, which processes and displays information in the form of a number of spreadsheet cells identified by coordinates (for example, A1 for the cell at the intersection of first row and first column).

This spreadsheet program is enhanced by an add-in. This add-in can be loaded by selecting it from a drop-down menu in the interface of the spreadsheet program itself, or by pre-configuring the spreadsheet program (or by using a platform registry) so that the add-in is automatically loaded whenever the spreadsheet program is launched. Alternatively, a separate, freestanding program can be launched that may (a) link to and obtain service from a spreadsheet program using, for example, an OLE protocol; or (b) permit two-way communications with a spreadsheet program using, for example, a DDE protocol or other protocol permitting communications and providing spreadsheet services. In still other embodiments the spreadsheet program can provide a "hook" that allows an independent program written in a native programming language to temporarily gain control of a process before returning control back to the original application.

Figure 4:
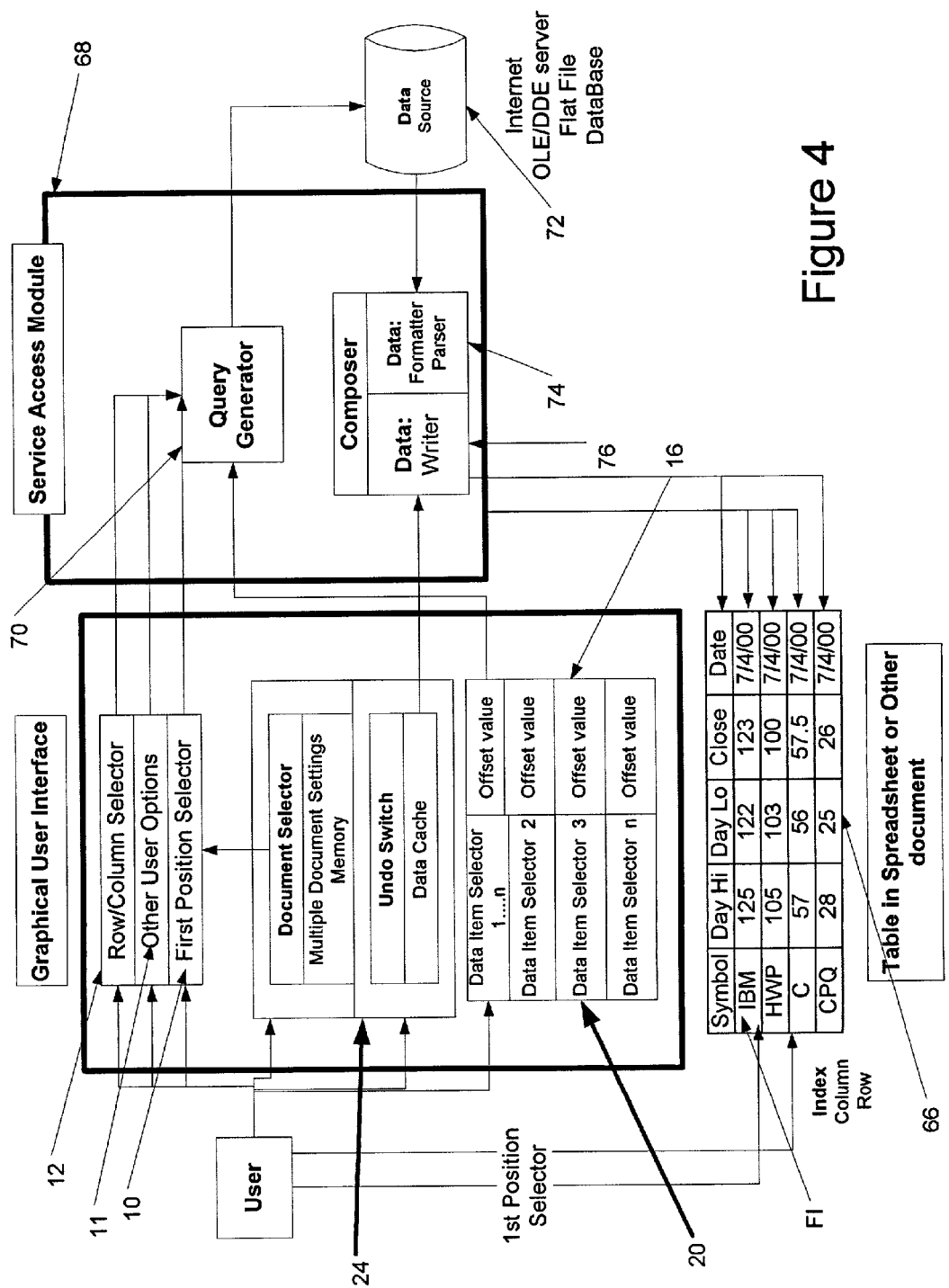
FIG. 4 is a more detailed diagram of the system architecture of the enhanced application of FIG. 2.

Referring to FIG. 4, a system architectural diagram is given of an object that enhances a spreadsheet program, which spreadsheet is schematically indicated herein as table 66. The software object is composed of several modules offering various services and functions. A service access module 68 is shown with a query generator 70 coupled to a data source 72 in order to fetch information therefrom.

In instances where information is obtained over the Internet, query generator 70 will produce a URL annotated with user input information designed to elicit specific information from a web-based data source 72 (e.g., web server 62 of FIG. 3). In other instances, query generator 70 can produce a database query using, for example, a SQL command. In the latter case the data source 72 may be a database accessible through a database server over a network (e.g., database server 54 of FIG. 3), or a database file that is available on the hard drive of a user's PC (e.g., database file in hard drive 40A of FIG. 3).

Information returning from the data source 72 is delivered to a composer. 74/76. This composer is shown receiving information from data source 72 into a formatter/parser 74, which feeds its output to a data writer 76. Component 74 can parse information to isolate the requested information from other information that is returned by the data source 72. In the situation where the data source is providing web pages fetched over the Internet, parsing is performed by pre-programming component 74 with information about the layout of the web page being returned. For example, component 74 may extract a data block appearing after a specific keyword; or may extract data strictly based on its position in a specific string. After parsing and extraction, component 74 can also format the extracted information, that is, establish a font, an alignment, etc.

The composer's data writer 76 is shown communicating with the spreadsheet table 66. As described further hereinafter, cells in the spreadsheet will be populated with data obtained from the service access module 68.

A graphical user interface 78 is shown communicating with the query generator 70 and data writer 76. Interface 78 is shown with a data items selector 20, which enables a user to designate up to n data items representing different data types. As explained further hereinafter, these data types can correspond to categories of financial information about stocks or other securities; for example: price of last trade, change in share price, percentage change in share price, etc. It will be appreciated that other classes of information can be specified for interfaces designed to fetch a different category of information.

Interface 78 provides a number of components that the user can selectively operate. With component 10 the user can identify a "first symbol" position. As shown in table 66 the first column is a list of symbols, the first (F1) being "IBM." The user can identify this first symbol F1 either by pointing to it with a mouse or by explicitly entering its coordinates.

With component 12 the user can specify whether the previously mentioned symbols are arranged in a row or column. In the example given for table 66, the symbols are arranged in a column and are ordinary expressions (i.e., they are not programming code and are ordinary terms in the relevant field; here, securities trading). Other options are provided as generally indicated by component 11, which will be explained in further detail presently.

Previously mentioned data items selector 20 has associated therewith components for setting a spatial offset for the n data items. As explained further hereinafter, the cells in table 66 need not be populated by writing in sequence into the cells next to the symbols (in the example of table 66, the symbols are in the column of symbols that starts with first symbol F1). Instead, components 16 can be used to specify an offset value indicating the number of cells to skip before writing the data for the associated data type.

A number of features are provided by component 24. The upper block shows a document selector that enables a user to save and recall various settings that were entered through components 10, 11, 12, 16, and 20. This feature allows the user to store in memory settings for multiple documents. The lower block indicates an undo feature that allows the user to reverse the most recent changes to the settings of components 10, 11, 12, 16, and 20. Basically, the interface stores previous settings in a data cache and restores them when requested by the undo function.

This system is described within the context of an example application, consisting of a portfolio of individual securities, updated from a web page or pages. The foregoing assumes the following are available:

1. Web pages or other data sources. In each case the data source 72 will deliver the requested data in response to a query or other request from the user. For instance, in the case of a stock symbol F1 used as a query term, a web page can be fetched that shows items such as last price, high, low, volume, etc. In general, the structure of the data from the underlying data source is transformed to match the structure of the data required in the end user's document or file.

2. A document or file prearranged into a dimensioned or structured format (such as rows and columns) and requiring information from the underlying data source. In one example, this may be a stock portfolio presented in a spreadsheet that requires the price data so that its total value would reflect the latest data.

3. A predetermined row or column in the document or file, which will be used to index the row/column data items to the data source. For example, the stock symbols in the first column can be used to create a query to the data source for High, Low, Close, etc.

Figure 5:
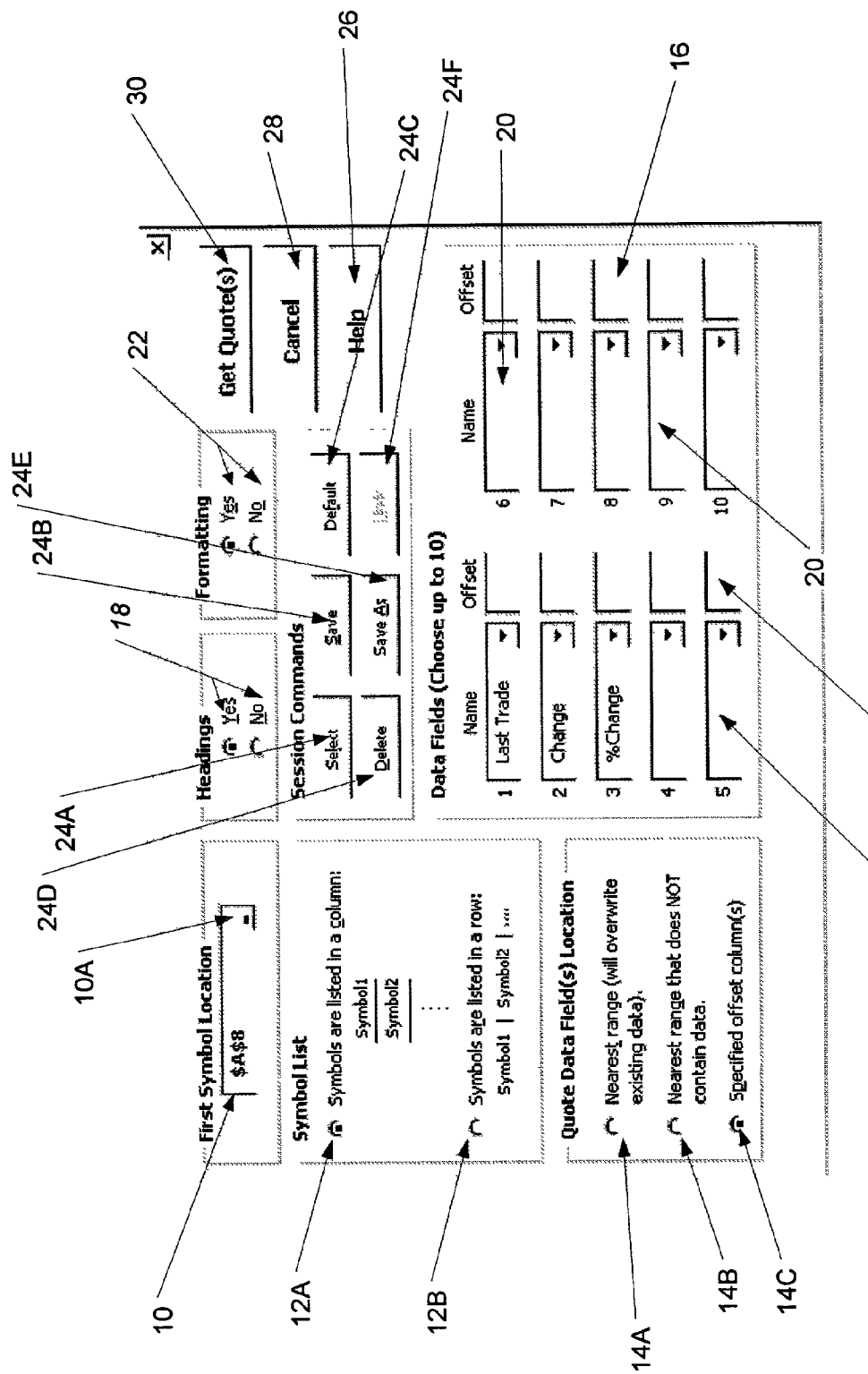
FIG. 5 is a diagram of the graphics associated with the interface of FIG. 4.

Referring to FIG. 5, the graphical presentation is given for the interface (interface 78 of FIG. 4). The graphical features corresponding to software components previously illustrated in FIG. 4, will bear the same reference numeral where appropriate. The interface offers the following components and features:

First Symbol Location

The user enters in data entry box 10 the coordinates of a cell, such as a column/row reference from a spreadsheet or the column/row cell references defined in a table in a word processing document. The symbols entered in a cell may represent securities listed on the various exchanges for stocks, bonds, futures, etc.

Symbol List

Symbols may be listed in either a column or row format. The user indicates a preference in one of these two orientations by checking the appropriate radio button 12A or 12B. The returned data will then be presented using the column or row format if button 12A or 12B is checked, respectively.

Quote Data Field(s) Location

The software data writer has the ability to place retrieved data in specified fields relative to the selected first symbol location placed in box 10. Specifically, by checking button 14A, the returned data will be placed in the nearest cell location relative to the first symbol location specified in box 10, proceeding along a row or a column, depending on whether button 12A or 12B is checked. For example, if the user's array of query data are arranged in a column of stock symbols, and specified as such by button 12A, then the returned data will be laid out perpendicular to the column, i.e., in a row. In other examples the roles of the column and row can be interchanged if button 12B is selected. In any event, the present software will overwrite any existing data that may be in one of the receiving cells if button 14A is selected.

If button 14B is selected instead, the returned data will be written in the nearest blank cell relative to the first symbol location specified in box 10, proceeding along a row or column, depending on whether button 12A or 12B is checked.

If button 14C is selected instead, ten additional data field entry boxes are deployed, as indicated by the boxes 16, shown in phantom. These boxes 16 will switch from inactive and hidden to active and visible when button 14C is checked. This mode offers an offset feature that allows the user to place the retrieved data somewhere other than a default location. The offset value will be entered in the data field entry box 16 as a numeric integer value, signed negative numeric values being permitted.

Data Fields

The user has the ability to select up to ten data fields for retrieval, although a different number may be available in other embodiments. Here ten drop-down selection boxes 20 are provided, marked with the numeric indicia 1 through 10. By clicking the drop-down button on the right end of the box 20, a list of data types will be displayed. For this embodiment, which concerns securities data, the possible types of data include: (a) last trade, (b) change, (c) percent change, (d) bid, (e) ask, (f) open, (g) previous close, (h) today's high, (i) today's low, (j) 52-week high, (k) 52-week low, (l) volume, (m) average volume, (n) market capitalization (millions), (o) price/earnings ratio, (p) annual dividends per share, (q) ex-dividend date, (r) dividend yield, (s) market (exchange), (t) date of last sale, (u) time of last sale, and (v) source of displayed data.

Some embodiments may offer a shorter list that includes a subset of the foregoing list, possibly supplemented with other data types. Other embodiments will offer a longer list that may include supplementary or substitute data types. The supplementary or substitute data types may include: (a) size of last sale, (b) volatility, (c) earnings, (d) shares outstanding, (e) earnings per share, (f) dividend amount, (g) dividend frequency, etc. In some embodiments, different ones of the selection boxes 20 may have a different drop-down list. In other embodiments unconcerned with securities, a completely different list of data types will be offered.

Figure 1:
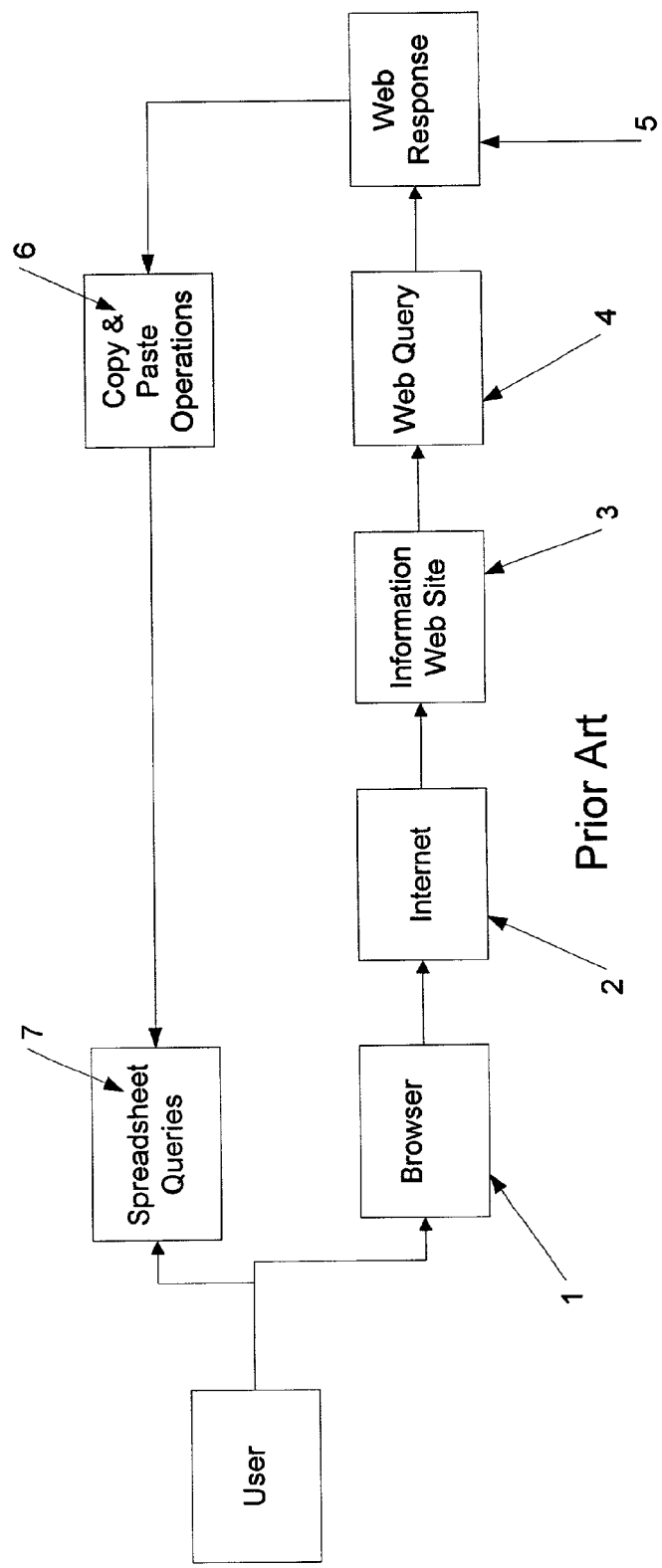
FIG. 1 is a graphical illustration of a process that can be conducted using techniques conventional in the prior art.
Figure 2:
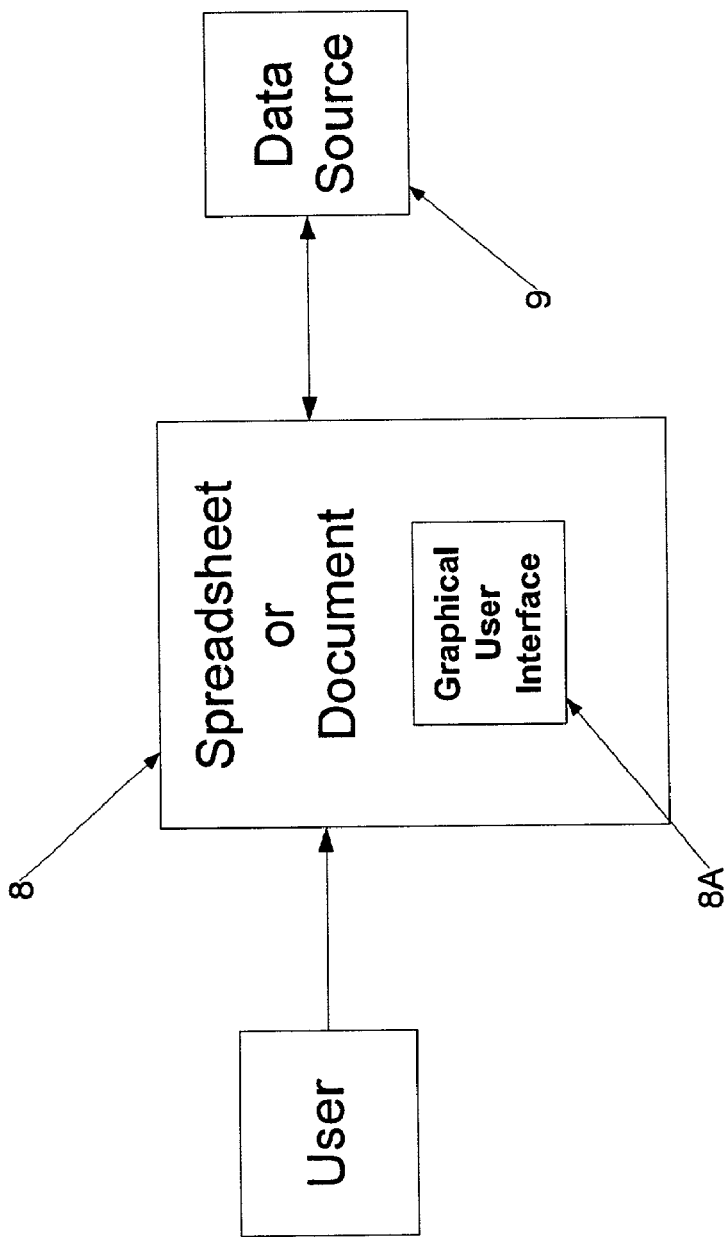
FIG. 2 is a high-level diagram of an application enhanced with a software object and capable of implementing a method in accordance with principles of the present invention.

The order in which the data is displayed is based on the sequence of fields selected with the selection boxes 20 (with exception noted below). Thus, in the example of FIG. 2 the returned data types will be displayed in the following sequence: "last trade," "change," and "% change," in that order. The sequence can be overridden when the data field location offset is selected (button 14C). In that case blank fields 16 appear adjacent to the ten main data selection boxes 20. The user manually enters the desired numeric values for the offset (including possible negative offsets), which then controls the location of the displayed output without regard to its position in the sequence of selection boxes 20.

Headings

The user can select either one of the two yes/no buttons 18 to indicate a preference for column (row) headings for displaying the names of the data fields selected by boxes 20.

Format

The user selects one of the two yes/no buttons 22 to indicate a preference for the presentation of data. The data can be displayed in either free form ("no" button 22), or formatted to significant decimal positions ("yes" button 22).

Session Commands

The foregoing selections can be saved so they can be recalled for use as a template in new projects or for reuse in a previously configured document or file that was already setup in an earlier session. The following session commands are available to the user for such purposes:

The Select button 24A will pop up a dialog box to allow the user to select a stored configuration. The Save button 24B will pop up a dialog box so the user can store the selection criteria of the current session. This dialog box will prompt the use for a name under which the configuration will be saved.

The Default button 24C allows the user to store the current configuration as the default values that will be used in new sessions, until changed by the user in that session. The application comes with several input and output settings stored as default values, but those values can be overridden with this feature. The user can select the most common usage of the session commands and save it as a default command with this feature. This enables the user to restore those favorite without remembering the name of the store.

The Delete button 24D will pop up a dialog box to allow the user to select a stored configuration and delete this stored session command. The Save As button 24E will pop up a dialog box to allow the user to save a previously stored configuration under a new name.

The Undo button 24F reverses the most recent changes to the settings of FIG. 5 and restores the prior settings.

Operation

Figure 6:
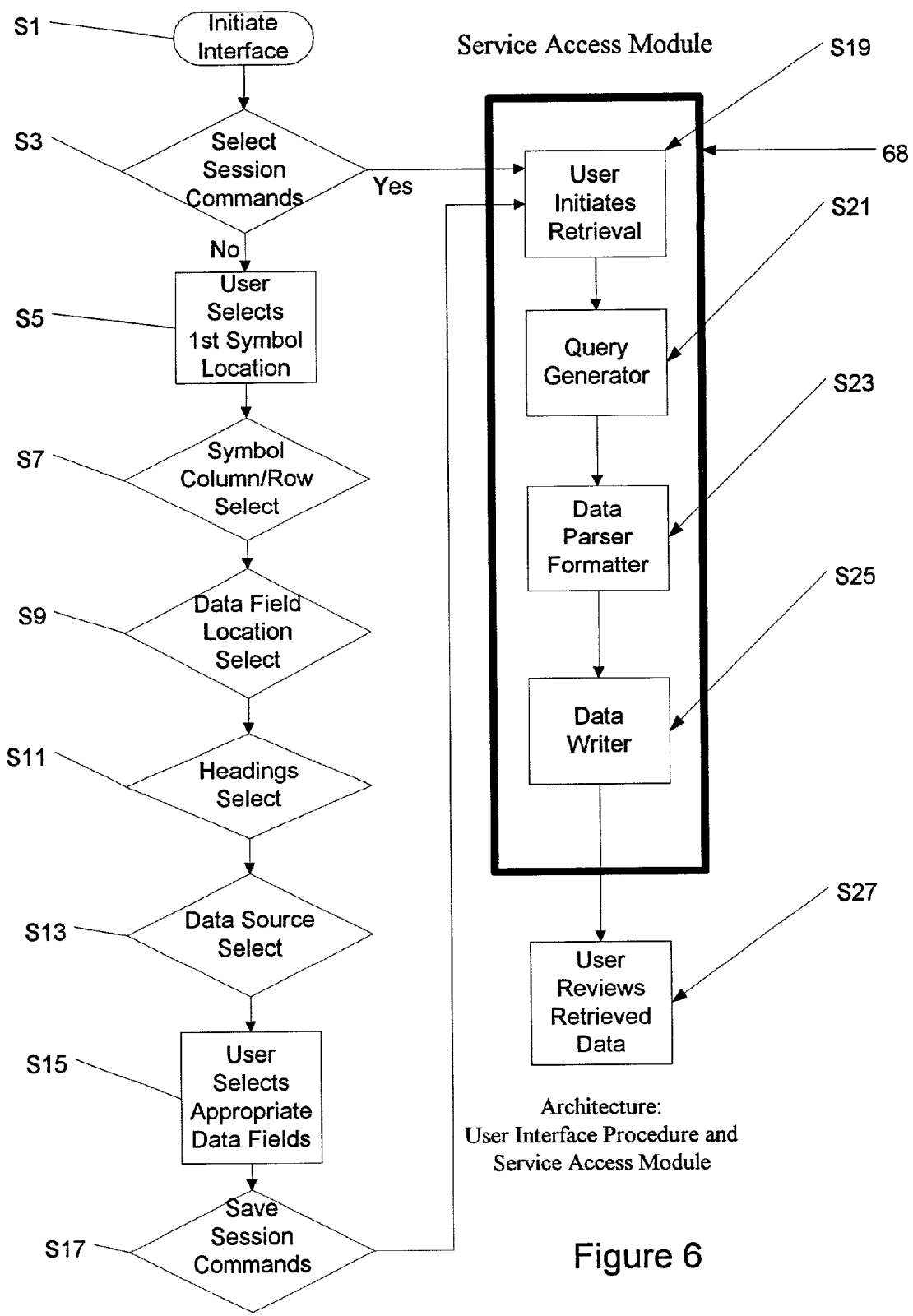
FIG. 6 is a flowchart associated with the software of FIG. 4.
Figure 7:
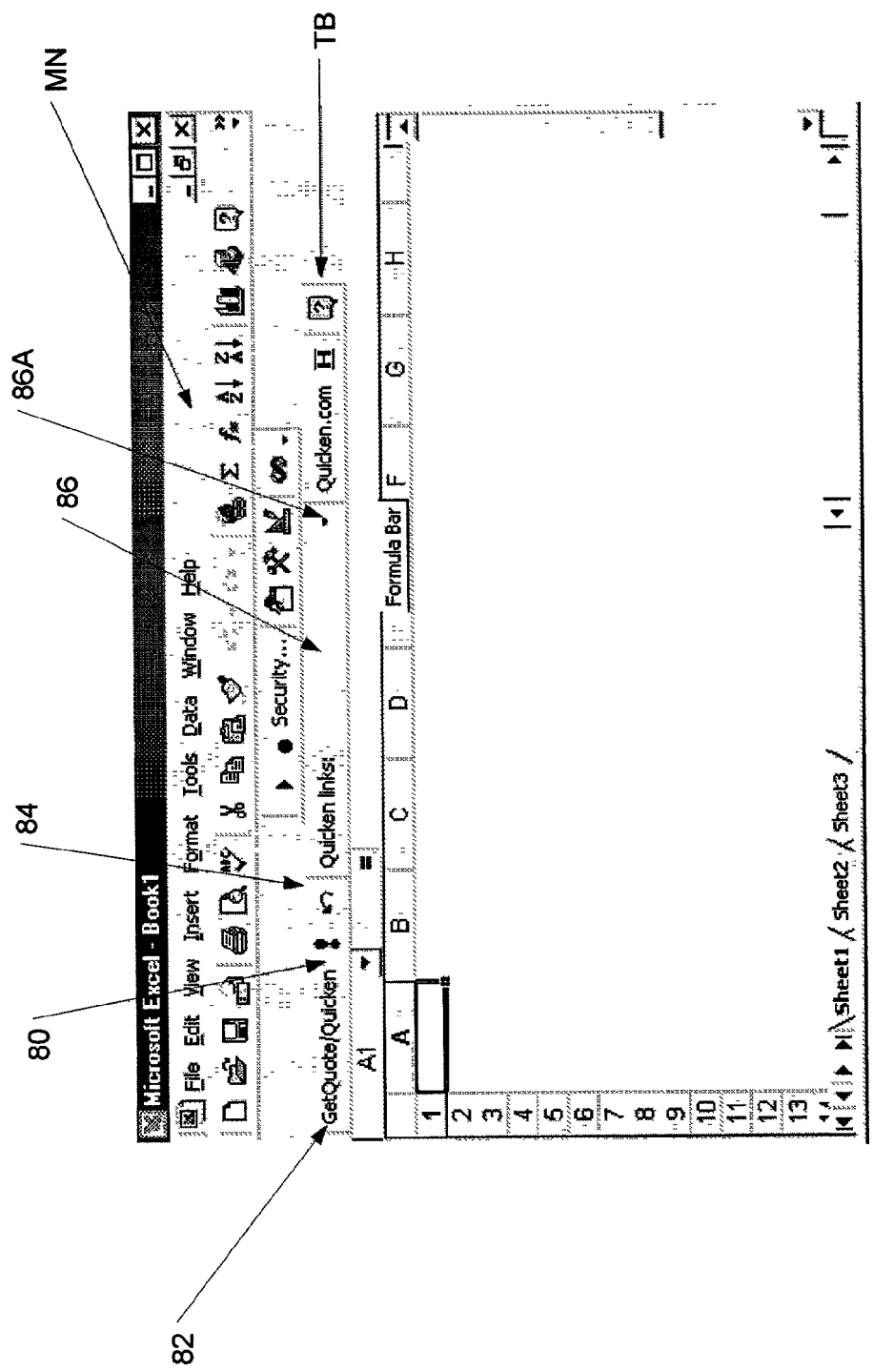
FIG. 7 is a detail of the menu and toolbar of the enhanced application of FIG. 2.

To facilitate an understanding of the principles associated with the foregoing apparatus, its operation will be briefly described in connection with the operations of FIG. 6. The sequence of FIG. 6 is not a simple flowchart, but a hybrid showing a specific sequence of operations that the user may actually choose to exercise when taking advantage of the interface of FIG. 5. In step S1 the interface of FIG. 5 is popped up either by selecting a menu item (from menu bar MN of FIG. 7) or by clicking icon 82 on the toolbar TB of the spreadsheet program. The user can obtain help on using the interface by clicking on button 26 (FIG. 5). Alternatively, the user can cancel the interface by clicking on button 28.

In step S3 of FIG. 6 the user may restore previously saved sessions by operating select button 24A (FIG. 5). A dialog box will pop-up and display session commands previously saved under names chosen by the user.

Assuming the user has not restored (or is not satisfied with) previously saved session commands through button 24A, the user may now select a first symbol location, as indicated in step S5. Specifically, the user may type in box 10 (FIG. 5) the coordinates of a specific spreadsheet cell (e.g., the coordinates of cell Fl of FIG. 4).

Alternatively, the user may click on selection box 10A. In response, the dialog box of FIG. 5 will collapse to a narrow box to make the underlying spreadsheet cells visible. Also, the cursor will change to a special symbol; for example, a large "X". The user may click the special cursor on the first symbol (for example symbol Fl of FIG. 4). The symbol becomes highlighted and the user may now click the collapsed, narrow dialog box to restore it to full-size.

In step S7 of FIG. 6 the user can select one of the radio buttons 12A or 12B (FIG. 5) to indicate whether the symbols are listed in a column or row, respectively. In the example of FIG. 4, the symbols are listed in a column.

In step S9 of FIG. 6 a user can specify certain writing options by selecting one of the radio buttons 14A through 14C (FIG. 5). Overwriting will occur with button 14A, but with button 14B cells will be skipped to avoid overwriting cells containing data. If button 14C is selected, boxes 16 are deployed so that the user can specify a cell offset.

In step S11 of FIG. 6 a user can specify whether the information displayed through this program will be formatted (predetermined fonts, alignment, etc.) by using radio buttons 22 (FIG. 5). Also, the user can specify whether this program will automatically provide headings for each of the columns (or rows) of data returned to the spreadsheet program by using radio buttons 18 (FIG. 5).

In step S13 of FIG. 6 the user can specify what data source will supply the requested data. A dialog box (not shown) can pop-up and offer a number of data sources. For example, the user can select any one of a number of displayed web sites.

Also, the user can select whether data will be obtained over the Internet, over a network from a local or remote database server, from a database file contained on the user's computer, etc. As needed, the user can supply a URL, domain name, network address, gateway, password, etc. The user can also be given the ability to add the identity of data sources that have not been pre-programmed into this software.

In step S15 the user will operate the data fields selection boxes 20 (FIG. 5). By clicking the drop-down button to the right of each of the individual boxes 20, the user will be offered a drop-down menu listing data types as specified above. By highlighting one of the data types the user can add that data type to the user's selection. The user will make as many selections as needed. In this embodiment ten selections are possible (although the software can be operated multiple times to display more than ten data types in a single spreadsheet). In other embodiments a different total number of selections may be offered.

In step S17 user may save the session by clicking on button 24B (FIG. 5). This will save to the previously opened session file, or if none was opened, pop-up a dialog box that allows the user to select the name under which the session will be saved. If the user wishes, a previously opened session file can be saved under another name by clicking on button 24E.

Once the various commands are established using the foregoing steps (or by relying on default settings, or on recalled sessions) the user may click on button 30 of FIG. 4 to operate the service access module 68 of FIG. 6, thereby invoking step S19. In the following step S21 the query generator (generator 70 of FIG. 4) will read the symbols found in the symbol column, starting with symbol Fl of table 66 (FIG. 4).

Assuming data source 72 is a web site, query generator 70 will compose a URL that will include input data corresponding to the previously mentioned symbols. In the embodiment of FIG. 3 the request will be sent along network cable 48 to server 58, which will transmit the request to Internet 60. In this instance the URL points to web server 62, which receives the query and examines the input data transmitted with the request. Server 62 will fetch appropriate data from financial database 64.

In this embodiment, web server 62 will compose a web page using a markup language such as HTML, XML, or other languages. This web page will be composed primarily for display on a web browser. Thus, this web page will have much extraneous information. In particular, the web page may return every data type that the site offers, even though the user may only wish to review a subset of these data types. Also, this web page may present its data in columns, whereas the user wishes to view the information in rows. Moreover, the web page may present information concerning several stock symbols and this information may be presented in a consolidated table or in separate tables that are not arranged in a fashion desired by the user.

Accordingly, the parser/formatter 74 (FIG. 4) is executed in step S23 of FIG. 6. Component 74 is pre-programmed with information about the layout of this web page. For example, component 74 may expect this web page to start one of its lines with a stock symbol followed by a predetermined sequence of data types concerning that stock symbol. Alternatively, a line of stock symbols may be followed by successive lines, each containing just one data type in the same sequence as the stock symbols.

In any event, the present program may store the requested information in arrays for use later during the writing process. The data may be formatted at this time. For example, certain information may be presented in a currency format and the type point size may be reduced for numbers having a large number of digits. If data is unavailable, an appropriate warning may be supplied for this item. Otherwise, the information will be formatted in the default format or the format specified by the user (font type, alignment, etc.).

In the following step S25 data is written to the spreadsheet table 66 (FIG. 4) so that the user can review the output in step S27. The table 66 of FIG. 4 is a simple presentation where the user does not provide any of the displayed information except for that appearing in the symbol column containing first position Fl. Thus, the four following columns including their headings are provided by the present software object.

In some instances, the user will wish to provide additional information, such as the number of shares owned by the user for each of the stock symbols. Accordingly, Table 1 shows a situation where the user has prepared the first two columns: (1) the stock symbols (IBM, GE, XOM), and (2) the number of shares owned (250, 100, 300), including the heading for the second column, "No. Shares." The user also supplied the banner heading, "John User's Stock Portfolio."

TABLE 1

JOHN USER'S STOCK PORTFOLIO

|  | No. Shares | Last Trade | Value | Change % | Change | Open |
|---|---|---|---|---|---|---|
| IBM | 250 | 89.100 | 22275.00 | 0.020 | 0.02 | 89.120 |
| GE | 100 | 37.700 | 3770.00 | −1.300 | −3.33 | 38.750 |
| XOM | 300 | 77.700 | 23310.00 | −2.110 | −2.64 | 79.750 |
|  |  |  | 49355.00 |  |  |  |

In this example, the user has also created a fourth column having the heading "Value." The three illustrated cells under this heading (referred to herein as a derived sites) each contain a formula to obtain the product of the numbers in the two cells to the left in that row (those two cells referred to herein as source sites). For example, the number of shares of GE (100) is multiplied by the price at the last trade (37.7) to calculate the displayed value of 3770.00.

The user has also placed a formula at the foot of the fourth ("Value") column. Specifically, this formula calculates the sum of the three numbers immediately above. Accordingly, the user will see the value of each share, the value of the user's holdings for each company, and the total value of all holdings. Using vector notation, if the numbers of the second and third columns are considered vectors, their scalar product (dot product) would equal the total value appearing at the bottom of the fourth column.

To avoid overwriting the user's input, the present program should not write information indiscriminately to the right of the first column. Using normal procedures, the user will identify the first symbol position as that cell containing the stock symbol "IBM." Then, the user can select button 14B (FIG. 5) so that information will not be written over the second column entitled, "No. Shares." Instead, the software will skip the second column and begin writing information in the third column. The software will also notice that formulas appear in the fourth column and will skip that column as well. Therefore, the software will next write in columns 5–7.

Alternatively, the user can select button 14C of FIG. 5 in order to specify specific offsets. Consequently, the offset entry boxes 16 will appear. The user will insert "2" in the first box so that the first data type will be offset two columns and be written therefore in the third column. Next, the user can specify an offset of "4" for the second data type. The offset for the third data type will be "5," and so forth.

For the example given in Table 2 the user has specified that the symbols are listed in a row. In this instance the user will identify the first symbol location as that spreadsheet cell containing the symbol "UST." If this first symbol is considered being in a first row, the second row is shown containing information entered by the user, namely, the number of shares owned by the user for each of the stock symbols. The fourth row has formulas. As before, this fourth row calculates the product of the two numbers immediately above to determine the value of the holdings of the company identified by the stock symbol. Also as before, the user can use the options offered by buttons 14B or 14C so that none of the numbers or formulas entered by the user will be overwritten. In this example the user also calculates the total value of all holdings by summing the values contained in the fourth row entitled "Value." In order to make a more compact presentation, this total value appears in a formula located below the main body of the spreadsheet.

It will be noticed that the numbers and headings have been automatically formatted by the present software. In particular, the headings have been boldened and left justified while numbers have been right justified. The numbers in the penultimate row have distinct formatting that was applied by the present software. Specifically, the first two entries have a relatively small point size, and the last entry has a greater point size, but one that is still smaller than the other numbers in the other rows.

TABLE 2

MARY TRADER'S STOCKS

| Stock Symbol | UST | CIT | SUN |
|---|---|---|---|
| No. Shares | 250 | 100 | 300 |
| Last Trade | 27,230 | 29,300 | 30,720 |
| Value | 6807.50 | 2930.00 | 9216.00 |
| Change | −0,430 | −0,200 | −1,760 |
| % Change | −1.55 | −0.68 | −5.42 |
| Open | 27,660 | 29,550 | 32,200 |
| 52-wk High | 32,700 | 31,810 | 37,000 |
| 52-wk Low | 13,870 | 13,310 | 23,750 |
| Volume | 933,800 | 2,544,700 | 620,500 |
| Mkt Cap (mil) | $1,212,470.00 | $6,856,110.00 | $729,590.00 |
| Annual div/Shr | 4436.50 | 7673.90 | 2604.87 |
| Total Value $18,953.50 | | | |

After one of the foregoing tables have been created it can be stored using the files save commands provided by the underlying (unenhanced) spreadsheet program. Thereafter, the user can recall the spreadsheet file to display all of the information previously obtained. After the user highlights the first symbol cell (for example, the cell containing the stock symbol UST in Table 2) the user can quickly update the table (update mode) by clicking the appropriate icon (item 80 of FIG. 7) on toolbar TB. Since all the configuration commands selected in the previous session have been restored with this file, the present program will immediately begin to update the spreadsheet display by fetching more recent information from the data source. If for some reason this updated information is not desired, the user can reverse the updating (undo mode) by clicking the undo icon (item 84 in toolbar TB of FIG. 7).

The user may also link to web sites having general information about the companies listed in this spreadsheet by highlighting one of the stock symbols. Next, the user can click the drop-down button 86A of icon 86 and select one of the information sources displayed thereby. After selecting one of these sources the present program will automatically launch the default browser and the user can view the relevant information on web pages from this web source.

If the user wishes to change the configuration settings, the user can click icon 82 of toolbar TB to pop up the graphical interface of FIG. 5. The user can then change the complement of data fields previously selected or change other settings. Thereafter, the user can save these new sessions settings by clicking button 24B.

The foregoing operations demonstrates many of the advantages of the present system. The updating of a document is done automatically without copy and paste operations by the user. The user is given the ability to create data requests without understanding programming or other structured requests or queries to the data source. The technique is also non-invasive. It does not require the user to import data or modify the underlying document with links.

The technique does not require the user to organize the document or file in an inflexible sequential order. In the foregoing examples, the user can insert a row or column that contains a formula showing the total amount of a stock position. The technique does not require the user to reorganize the document in any way to anticipate and accept the structure of the underlying web data source. Data can easily be arranged in any sequence within a row or column organization.

The technique provides a method to update multiple documents, each with a unique reorganization, without having to manually reprogram the software.

The user is able to query the data source by entering familiar, non-programming expressions in the underlying document or file. Such simple entries then enable the user to import data in a sophisticated way into a set spreadsheet, or other document. Also, the user can (a) choose the order and sequence of the retrieved data; (b) format and place the retrieved data in prescribed positions; (c) store user defined data format options for future use; (d) automatically refresh or undo changes from previous requests; and (e) link to and retrieve other pertinent information related to a document.

The system eliminates arduous collection methods that require users to navigate to select web sites in order to download data. The technique does not require the user to copy and paste data, insert links, or modify the document in the way required by the prior art.

Using the Invention in Other Document Types

This type of software object and method of updating tables can be used in applications other than spreadsheets. Tables in a word processing document or presentation program that have a column and row orientation may be updated just as described for the spreadsheet application.

Additionally, the foregoing may be used on one-dimensional arrays. Within a word processor document an item called a "bookmark" is used to locate a specific line and character position. All the bookmarks in a document can be organized into an array to form an index that lists all the bookmarks in a document in sequential order from beginning to end. This array can then be used by a software object such as an add-in program that runs concurrently with the word processor to insert text from a data source into the document.

One example of this would be an add-in program designed to insert data from a legal case history database into a word processing document. The database for this example is indexed by the name or citation of the case. Data items for each case may include such data as case history, other cases citing this case with treatment (approval/disapproval), summary, court, date of specified actions, parties' names, attorneys' names, prosecutor's name, judge's name, judgment, etc.

The add-in program would allow the user to define the bookmark where the name (or citation) of the case is to be inserted. A series of drop-down dialogs would then be used by the user to select the additional data items to be brought into the document. With each data item, the user would be able to select an offset number. This number would define the number of bookmarks between the "case name" bookmark and the bookmark for the data item.

As a specific example, consider a document organized into 10 bookmarks listed in order as (Bookmark1 . . . Bookmark10). The user would specify that Bookmark3 is the location to find the case name (or citation). An additional data item could then be selected (such as the date of the case) by using a drop-down dialog box. Further a negative offset of −2 may be specified with the selected data item. This would insert the date of the case into Bookmark1.

In practice, given a limited number of bookmarks within a document, an alternative method of inserting data may be used. This alternative method would address the bookmark's absolute name rather than its relative position. As before, a series of drop-downs would be used to select the items from an organized data source that are to be inserted into the text document. Instead of an "offset," an additional drop-down list could be presented for each data item listing all the bookmarks within the document. Each data item would then have a unique bookmark associated with it to identify where in the document it should be inserted.

It is appreciated that various modifications may be implemented with respect to the above described, preferred embodiment.

In some embodiments the software object may be structured as a plug-in that is used in a web browser such as Netscape Communicator™ or Internet Explorer™. This plug-in can be pre-programmed with information about the layout of certain web pages. The plug-in can parse the desired information identified by the user and display it in a fashion similar to that described above. In other embodiments the information obtained over the Internet can be organized using XML (extended markup language) so that the data source provider can identify the information of interest so that the user need not have detailed advance knowledge of the layout of a web page. In this situation the web browser may be enhanced to handle the specially tagged information with a plug-in. Alternatively, another application, such as a spreadsheet or database program, may be enhanced with the ability to fetch information over the Internet and process it appropriately using the XML tags.

In still other embodiments the present software object may be adapted to enhance any one a variety of applications, such as financial accounting software, communications software, personal database managers, email programs, graphics editing programs, etc. In other embodiments some of the features described above may be eliminated, and other features may be offered, such as automatic adjustment of column widths, alarms when a holding passes through a user-defined threshold, tips on trading securities (or some other topic), a selection of prototype spreadsheets (or database files, or word processing documents), etc. When using a prototype the user need not supply the symbols (such as the symbol F1 of FIG. 4); or prototype symbols may be offered as examples that the user will modify. Also, the present software object can respond to a single request by simultaneously retrieving and displaying information from different sources (for example, two Internet sources and a database maintained by the user).

There is no restriction on the types of data that can be requested and displayed. In some embodiments the user will be offered selections, so that the present software object will seek information of an alternate type; for example, sports statistics, movie theater showings and times, cultural events, election statistics, shopping information including comparative prices, etc.

In addition, the present software object can be run on a simple PC, a workstation, a terminal of a larger computer, etc. Furthermore, an application enhanced with the present software object needed not reside on the user's computer or terminal, but may run on a server accessible over a private network or over the Internet.

Obviously, many modifications and variations of the present invention are possible in light of the above teachings. It is therefore to be understood that within the scope of the appended claims, the invention may be practiced otherwise than as specifically described.

The invention claimed is:

1. An object for enhancing an application that without enhancement is ordinarily capable of presenting information in an array of data elements, the unenhanced application permitting a user to enter or retrieve at least one ordinary expression for processing and display in the array of data elements, the object being capable of accessing a data source and comprising:
   a query generator for (a) interposing in ordinary operations of the application in order to read the ordinary expression previously entered manually by the user in the array of data elements, and (b) requesting information from the data source based on the ordinary expression;
   a composer for interposing in ordinary operations of the application in order to (a) receive requested information from the data source in response to said query generator and (b) transfer the requested information to the application for processing and display in the array of data elements alongside the ordinary expression before returning to a condition where the application operates autonomously; and
   an interface for interposing in ordinary operations of the application in order to allow the user to specify in advance of a request (a) where in the array of data elements the query generator will find the ordinary expression, and (b) where in the array of data elements the requested information will be displayed relative to the ordinary expression.

2. An object according to claim 1 wherein said interface is a graphical user interface.

3. An object according to claim 1 wherein said object is a operable by the user without using programming code extraneous to normal use of the application.

4. An object according to claim 1 wherein said object is properly operable by the user after entry of the ordinary expression into the application without any further prerequisite.

5. An object according to claim 1 wherein said interface is operable to select the ordinary expression from among other features displayed by said application and identify the ordinary feature to the query generator.

6. An object according to claim 5 wherein said interface is operable to select and identify the ordinary expression by permitting the user to enter identifying information.

7. An object according to claim 5 wherein said interface is operable to select and identify the ordinary expression by permitting the user to point to the ordinary expression.

8. An object according to claim 5 wherein said application is a spreadsheet program, said interface being operable to select and identify a spreadsheet cell containing the ordinary expression.

9. An object according to claim 5 wherein said application is a word processing program, said interface being operable to select and identify a location corresponding to the ordinary expression.

10. An object according to claim 9 wherein said interface is operable to identify a bookmark corresponding to the ordinary expression.

11. An object according to claim 9 wherein said interface is operable to identify a table cell containing the ordinary expression.

12. An object according to claim 1 wherein said query generator is operable to fetch data over a communications network.

13. An object according to claim 1 wherein said query generator is operable to fetch data over the Internet.

14. An object according to claim 1 wherein said query generator is operable to fetch data from a database that is distinct from said application.

15. An object according to claim 1 wherein said composer is operable to parse data obtained from said data source by said query generator.

16. An object according to claim 15 wherein said composer is operable to extract the requested information and discard unrequested information.

17. An object according to claim 16 wherein said query generator is operable to fetch data over a global communications network.

18. An object according to claim 17 wherein said composer is preprogrammed with information about the expected layout of a web page in order to find and extract the requested information.

19. An object according to claim 1 wherein said interface is operable by the user to select a plurality of data types to be fetched by said query generator.

20. An object according to claim 19 wherein said interface is operable by the user to specify the order in which the plurality of data types will be displayed by the application, so that the order is not determined by the data source.

21. An object according to claim 20 wherein said interface is operable by the user to specify that the plurality of data types will be displayed by the application following the ordinary expression in a spatial sequence with overwriting permitted.

22. An object according to claim 20 wherein said interface is operable by the user to specify that the plurality of data types will be displayed by the application following the ordinary expression in a spatial sequence with skipping employed to avoid overwriting.

23. An object according to claim 20 wherein said interface is operable to save and retrieve selections made by the user affecting future operation of said composer.

24. An object according to claim 23 wherein said interface is operable upon a request by the user to automatically undo previous selections made by the user affecting future operation of said composer.

25. An object according to claim 19 wherein said interface is operable by the user to specify a spatial orientation with which the plurality of data types will be displayed by the application.

26. An object according to claim 19 wherein said interface is operable by the user to specify a plurality of spatial offsets associated with corresponding ones of the plurality of data types, the plurality of data types being displayed by the application with corresponding ones of the spatial offsets.

27. An object according to claim 19 wherein said application is operable to define a derived site for displaying a derived value based on data from one or more source sites displayed by said application, said composer being operable to specify that the plurality of data types will be displayed by the application following the ordinary expression in a spatial sequence that skips the derived site to avoid overwriting different types of data.

28. An object according to claim 19 wherein said application is operable to define a plurality of derived sites for displaying derived values based on data from a plurality of corresponding pairs of source sites displayed by said application, each of the pairs of source sites including one datum from the requested information and one datum entered by the user and displayed by the application, said composer being operable to specify that the plurality of data types will be displayed by the application following the ordinary expression in a spatial sequence that skips the plurality of derived sites to avoid overwriting different types of data.

29. An object according to claim 27 wherein said application is a spreadsheet program and the derived site displays the scalar product of a first and a second array of source sites displayed by said application, the first array including data from the requested information and the second array including data entered by the user and displayed by the application.

30. An object according to claim 19 wherein said requested information is securities information, said data source being a global communications network.

31. An object according to claim 19 wherein said requested information is formatted by said composer before display by said application, said composer being operable to transfer headings corresponding to said data types to said application for display.

32. An object according to claim 31 wherein said interface is operable by the user to adjust formatting by said composer.

33. An object according to claim 31 wherein said interface is operable by the user to disable headings generation by said composer.

34. An object according to claim 19 wherein said object is operable in an undo mode to restore the requested information displayed by the application to a state existing prior to the last transferral by said composer of the requested information to the application.

35. An object according to claim 34 wherein said application has a toolbar, said object placing an item in said toolbar for initiating said undo mode.

36. An object according to claim 19 wherein said object is operable in a refresh mode to update the requested information displayed by the application by repeating operation of said query generator and said composer in order to display relevant changes in said data source.

37. An object according to claim 36 wherein said application has a toolbar, said object placing an item in said toolbar for initiating said update mode without displaying said interface.

38. An object according to claim 1 wherein said application has a toolbar, said object placing an item in said toolbar for calling said interface.

39. An object according to claim 1 wherein said application has a menu, said object placing an item in said menu for calling said interface.

40. An object according to claim 1 wherein said application has a toolbar, said object placing an item in said toolbar for linking to a web site concerning the ordinary expression.

41. A method for enhancing an application, the unenhanced application permitting a user to enter or retrieve at least one ordinary expression for processing and display in an array of data elements, the method being performed with a software object and a data source and comprising the steps of:
  installing the software object in order to supplement ordinary operations of said application;
  entering the ordinary expression in the array of data elements of the application in the ordinary unenhanced way for processing and display;
  electronically reading the ordinary expression in the array of data elements by interposing in ordinary operations of the application;
  requesting information from the data source based on the ordinary expression;
  receiving requested information from the data source;
  automatically transferring the requested information to the application for processing and display in the array of data elements alongside the ordinary expression before returning to a condition where the application operates autonomously; and
  allowing the user to specify in advance of a request (a) where in the array of data elements the ordinary expression will be found, and (b) where in the array of data elements the application will display the requested information relative to the ordinary expression.

42. A method according to claim 41 wherein the method is performed without the user using programming code extraneous to normal use of the application.

43. A method according to claim 41 wherein the method is performed after the user enters the ordinary expression into the application without any further prerequisite.

44. A method according to claim 41 wherein the step of electronically reading the ordinary expression is automatically performed after the user manually selects the ordinary expression from among other features displayed by said application.

45. A method according to claim 44 wherein the manual selection of the ordinary expression being performed by the user enter identifying information.

46. A method according to claim 44 wherein the manual selection of the ordinary expression being performed by the user pointing to the ordinary expression.

47. A method according to claim 44 wherein said application is a spreadsheet program, the manual selection of the ordinary expression being performed by the user selecting and identifying a spreadsheet cell containing the ordinary expression.

48. A method according to claim 44 wherein said application is a word processing program, the manual selection of the ordinary expression being performed by the user selecting and identifying a location corresponding to the ordinary expression.

49. A method according to claim 48 wherein the manual selection of the ordinary expression is performed by the user identifying a bookmark corresponding to the ordinary expression.

50. A method according to claim 48 wherein the manual selection of the ordinary expression is performed by the user identifying a table cell containing the ordinary expression.

51. A method according to claim 41 wherein the step of requesting information is performed over a communications network.

52. A method according to claim 41 wherein the step of requesting information is performed over the Internet.

53. A method according to claim 41 wherein the step of receiving requested information is performed by fetching data from a database that is distinct from said application.

54. A method according to claim 41 wherein the step of automatically transferring the requested data to the application includes the step of:
  parsing data obtained from said data source.

55. A method according to claim 54 wherein the step of automatically transferring the requested data to the application includes the step of:
  extracting the requested information and discarding unrequested information.

56. A method according to claim 55 wherein the step of requesting information is performed over a global communications network.

57. A method according to claim 56 including the step of:
  recording in advance, information about an expected layout of a web page, the step of extracting the requested information being performed by taking information from predetermined locations identified by the expected layout.

58. A method according to claim 41 wherein the step of requesting information is performed by selecting a plurality of data types to be fetched in the step of automatically transferring the requested information.

59. A method according to claim 58 wherein the step of specifying in advance is performed by the user specifying the order in which the plurality of data types will be displayed by the application, so that the order is not determined by the data source.

60. A method according to claim 59 wherein the step of specifying in advance is performed by the user specifying that the plurality of data types will be displayed by the application following the ordinary expression in a spatial sequence with overwriting permitted.

61. A method according to claim 59 wherein the step of specifying in advance is performed by the user specifying that the plurality of data types will be displayed by the application following the ordinary expression in a spatial sequence with skipping employed to avoid overwriting.

62. A method according to claim 59 comprising the steps of recording and retrieving selections made by the user during the step of allowing the user to specify in advance.

63. A method according to claim 62 comprising the step of:
  upon a request by the user automatically undoing previous selections made by the user during the step of allowing the user to specify in advance.

64. A method according to claim 58 wherein the step of specifying in advance is performed by the user specifying a spatial orientation with which the plurality of data types will be displayed by the application.

65. A method according to claim 58 wherein the step of specifying in advance is performed by the user specifying a plurality of spatial offsets associated with corresponding ones of the plurality of data types, the plurality of data types being displayed by the application with corresponding ones of the spatial offsets.

66. A method according to claim 58 wherein said application is operable to define a derived site for displaying a derived value based on data from one or more source sites displayed by said application, the step of specifying in advance being performed by specifying that the plurality of data types will be displayed by the application following the ordinary expression in a spatial sequence that skips the derived site to avoid overwriting different types of data.

67. A method according to claim 66 wherein said application is a spreadsheet program and the derived site displays the scalar product of a first and a second array of source sites displayed by said application, the first array including data from the requested information and the second array including data entered by the user and displayed by the application.

68. A method according to claim 58 wherein said application is operable to define a plurality of derived sites for displaying derived values based on data from a plurality of corresponding pairs of source sites displayed by said application, each of the pairs of source sites including one datum from the requested information and one datum entered by the user and displayed by the application, the step of specifying in advance being performed by specifying that the plurality of data types will be displayed by the application following the ordinary expression in a spatial sequence that skips the plurality of derived sites to avoid overwriting different types of data.

69. A method according to claim 58 wherein said requested information is securities information, said data source being a global communications network.

70. A method according to claim 58 comprising the steps of:
   formatting said requested information before display by said application; and
   transferring headings corresponding to said data types to said application for display.

71. A method according to claim 70 wherein the step of formatting said requested data being performed by the user adjusting formatting.

72. A method according to claim 70 wherein the step of transferring heading is performed by the user either enabling or disabling headings.

73. A method according to claim 58 comprising the step of:
   conducting an undo mode to restore the requested information displayed by the application to a state existing prior to the last performance of the step of automatically transferring the requested information to the application.

74. A method according to claim 58 comprising the step of:
   conducting a refresh mode to update the requested information displayed by the application by repeating at least the steps of requesting information and receiving and automatically transferring the requested information in order to display relevant changes in said data source.

75. A method according to claim 41 wherein said application has a menu, said method being initiated by selecting an item in said menu.

76. A method according to claim 41 comprising the step of:
   linking to a web site concerning the ordinary expression.

* * * * *